(12) United States Patent
Williams

(10) Patent No.: US 10,055,800 B2
(45) Date of Patent: Aug. 21, 2018

(54) ENGINEERED MULTI-UNIT HEATING AND COOLING ENERGY MONITORING AND COST ALLOCATION SYSTEM

(71) Applicant: 2481679 ONTARIO INC., Port Hope (CA)

(72) Inventor: Rick Williams, Lindsay (CA)

(73) Assignee: 2481679 Ontario Inc., Port Hope (CA)

( * ) Notice: Subject to any disclaimer, the term of this patent is extended or adjusted under 35 U.S.C. 154(b) by 418 days.

(21) Appl. No.: 14/845,823

(22) Filed: Sep. 4, 2015

(65) Prior Publication Data

US 2017/0069040 A1  Mar. 9, 2017

(51) Int. Cl.

| | |
|---|---|
| *G07F 19/00* | (2006.01) |
| *G06Q 50/06* | (2012.01) |
| *G06Q 30/04* | (2012.01) |
| *G06Q 30/02* | (2012.01) |
| *F24F 11/00* | (2018.01) |
| *G05B 15/02* | (2006.01) |
| *F24F 11/30* | (2018.01) |
| *F24F 11/62* | (2018.01) |

(52) U.S. Cl.
CPC ............ *G06Q 50/06* (2013.01); *F24F 11/006* (2013.01); *F24F 11/30* (2018.01); *F24F 11/62* (2018.01); *G05B 15/02* (2013.01); *G06Q 30/0283* (2013.01); *G06Q 30/04* (2013.01)

(58) Field of Classification Search
CPC .... G06Q 50/06; G06Q 30/0283; G06Q 30/04; G05B 15/02
USPC ...................................................... 705/16, 34
See application file for complete search history.

(56) References Cited

U.S. PATENT DOCUMENTS

| | | | |
|---|---|---|---|
| 4,675,828 A | 6/1987 | Winston | |
| 4,804,957 A | 2/1989 | Selph et al. | |
| 6,161,100 A * | 12/2000 | Saar ....................... | G01D 4/004 |
| | | | 340/870.02 |
| 7,623,043 B2 | 11/2009 | Mizra et al. | |
| 2006/0004587 A1* | 1/2006 | Willbanks, Jr. ..... | F24D 17/0078 |
| | | | 705/413 |
| 2011/0082599 A1 | 4/2011 | Shinde et al. | |
| 2012/0071082 A1 | 3/2012 | Karamanos | |

(Continued)

OTHER PUBLICATIONS

Tredinnick, Steve "Fair and Equitable Energy Cost Allocation : Or how to slice the cheese?", District Energy, 2013, pp. 66-68, International District Energy Association.

*Primary Examiner* — Rokib Masud
(74) *Attorney, Agent, or Firm* — Millman IP Inc.

(57) ABSTRACT

In an aspect, a system is provided for determining an energy usage cost over a time period for a selected unit of a multi-tenanted building. The system includes a fluid mover for the selected unit, configured to operate at at least one pre-selected volumetric flow rate to deliver fluid flow to the selected unit; and a monitoring system configured to:
 a) detect uses of the fluid movers and detect the associated flow rate;
 b) determine the duration of use of each fluid mover;
 c) determine an energy usage cost for the selected unit based on the durations of use, on the flow rate associated with each detected use, on the durations of use for the other fluid movers, and based on a total energy usage cost for all the units of the multi-tenanted building; and
 d) indicate the energy usage cost for the unit for the time period.

17 Claims, 7 Drawing Sheets

(56) References Cited

U.S. PATENT DOCUMENTS

2014/0074730 A1\* 3/2014 Arensmeier ........... G06Q 10/20
  705/305
2014/0279712 A1\* 9/2014 Ortner ................ G06Q 30/0283
  705/412

\* cited by examiner

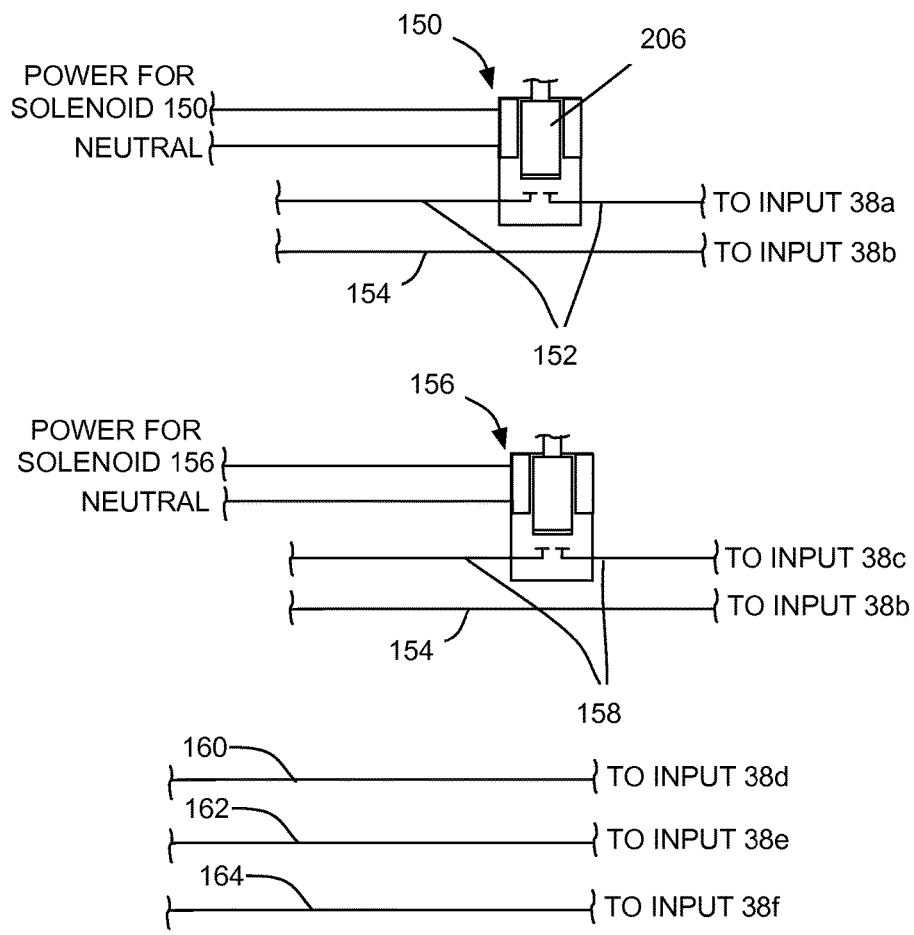
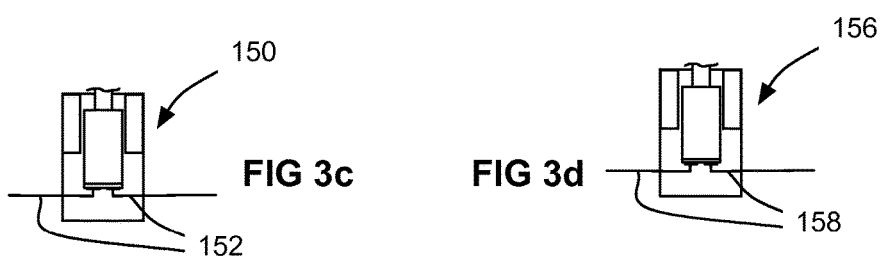

| Unit | Heating/Cooling | Duration (min) | Air Flow (CFM |
|---|---|---|---|
| 1 | Cooling | 64 | 350 |
| 2 | Cooling | 114 | 1425 |
| 2 | Cooling | 23 | 525 |
| 1 | Heating | 18 | 350 |
| 2 | Cooling | 14 | 1425 |
| 1 | Heating | 48 | 350 |
| 2 | Cooling | 24 | 525 |
| 2 | Heating | 32 | 525 |

FIG 4a

| Unit | Heating/Cooling | Duration (min) | Air Flow (CFM |
|---|---|---|---|
| 4 | Cooling | 64 | 350 |
| 3 | Heating | 24 | 475 |
| 3 | Cooling | 80 | 175 |
| 4 | Cooling | 56 | 650 |
| 3 | Heating | 112 | 325 |
| 3 | Cooling | 80 | 325 |
| 4 | Cooling | 97 | 350 |
| 4 | Heating | 24 | 350 |

FIG 4b

ENGINEERED MULTI-UNIT HEATING AND COOLING ENERGY MONITORING AND COST ALLOCATION SYSTEM

FIELD

The specification relates generally to systems and methods for the determination of an energy usage cost for a unit of a multi-tenanted building.

BACKGROUND OF THE DISCLOSURE

Some multi-tenanted buildings such as condominium buildings incorporate a central monitoring system that attempts to establish the individual energy usage of each unit in the building in order to establish a billing system where each unit pays for their individual amount of energy usage. However, systems that have been proposed for the task have several deficiencies. Some proposed systems incorporate BTU meters, which are meters that attempt to measure the precise amount of heat energy consumed by measuring precise inlet and outlet temperatures and the inlet or outlet flow rate. However, some BTU meters are notoriously inaccurate, unreliable and are subject to operations failures during use. Furthermore, BTU meters are relatively complex and expensive. Accordingly, there has been relatively poor adoption of these devices for this purpose. There is currently a need for a system and method of determining the energy usage cost for individual units in multi-tenanted buildings that is reliable, accurate, and cost effective.

SUMMARY OF THE DISCLOSURE

According to an aspect, a method is provided for determining an energy usage cost over a time period for a selected unit of a multi-tenanted building having a plurality of units including the selected unit and a plurality of other units, wherein each unit has an air mover associated therewith that is selectably operable at a plurality of pre-selected volumetric flow rates to deliver airflow to the associated unit, the method comprising:

a) detecting any uses of the air movers for any of the units and detecting the pre-selected volumetric flow rate at which the air mover whose use is detected is operating;

b) monitoring, for each use of the air movers, duration of use of the air mover;

c) determining an energy usage cost for the selected unit over the time period based on the durations of use during any detected uses of the air mover for the selected unit over the time period, based on the pre-selected volumetric flow rate associated with each detected use, and based on the durations of use during any detected uses of the air movers for the other units over the time period, and based on a total energy usage cost for all the units of the multi-tenanted building; and d) indicating to an occupant of the unit the energy usage cost for the unit for the time period.

In another aspect, a system is provided for determining an energy usage cost over a time period for a selected unit of a multi-tenanted building having a plurality of units including the selected unit and a plurality of other units, the system comprising:

an air mover for the selected unit configured to operate at a plurality of pre-selected volumetric flow rates to deliver airflow to the selected unit; and a monitoring system configured to:

a) detect any uses of the air movers for any of the units and detecting the pre-selected volumetric flow rate at which the air mover whose use is detected is operating;

b) determine, for each use of the air movers, duration of use of the air mover;

c) determine an energy usage cost for the selected unit over the time period based on the durations of use during any detected uses of the air mover for the selected unit over the time period, based on the pre-selected volumetric flow rate associated with each detected use, and based on the durations of use during any detected uses of the air movers for the other units over the time period, and based on a total energy usage cost for all the units of the multi-tenanted building; and d) indicate to an occupant of the unit the energy usage cost for the unit for the time period.

Optionally, for each of the aspects described above (and for any other aspects described herein), step c) may include:

e) multiplying the pre-selected flow rate by the duration for each use of the air mover for all the units to arrive at an energy usage value for each use of the air mover for the all the units in the time period;

f) summing all the energy usage values for all the uses of the air mover for the selected unit over the time period, to arrive at a total energy usage value for the selected unit over the time period;

g) summing all the energy usages for all the uses of the air movers for all the units of the multi-tenanted building;

h) obtaining the total energy usage cost for all the units of the multi-tenanted building; and i) determining the energy usage cost for the selected unit based on multiplying the total energy usage cost by the ratio of the value determined in step f) to the value determined in step g).

In another aspect, a system is provided for determining an energy usage cost over a time period for a selected unit of a multi-tenanted building having a plurality of units including the selected unit and a plurality of other units. The system includes a fluid mover for the selected unit configured to operate at at least one pre-selected volumetric flow rate to deliver fluid flow to the selected unit; and a monitoring system configured to:

a) detect any uses of the fluid movers for any of the units and detect the pre-selected volumetric flow rate at which the fluid mover whose use is detected is operating;

b) determine, for each use of the fluid movers, a duration of use of the fluid mover;

c) determine an energy usage cost for the selected unit over the time period based on the durations of use during any detected uses of the fluid mover for the selected unit over the time period, based on whichever of the at least one pre-selected volumetric flow rate is associated with each detected use, and based on the durations of use during any detected uses of the fluid movers for the other units over the time period, and based on a total energy usage cost for all the units of the multi-tenanted building; and d) indicate to an occupant of the unit the energy usage cost for the unit for the time period.

According to another aspect, a method is provided for determining an energy usage cost over a time period for a selected unit of a multi-tenanted building having a plurality of units including the selected unit and a plurality of other units, wherein each unit has an fluid mover associated therewith that is selectably operable at at least one pre-selected volumetric flow rate to deliver fluid flow to the associated unit, the method comprising:

a) detecting any uses of the fluid movers for any of the units and detecting the pre-selected volumetric flow rate at which the fluid mover whose use is detected is operating;

b) monitoring, for each use of the fluid movers, duration of use of the fluid mover;

c) determining an energy usage cost for the selected unit over the time period based on the durations of use during any detected uses of the fluid mover for the selected unit over the time period, based on whichever of the at least one pre-selected volumetric flow rate associated with each detected use, and based on the durations of use during any detected uses of the fluid movers for the other units over the time period, and based on a total energy usage cost for all the units of the multi-tenanted building; and d) indicating to an occupant of the unit the energy usage cost for the unit for the time period.

BRIEF DESCRIPTIONS OF THE DRAWINGS

For a better understanding of the various embodiments described herein and to show more clearly how they may be carried into effect, reference will now be made, by way of example only, to the accompanying drawings in which:

FIGS. 3a-3d are schematic view of a terminal block and connections to the terminal block that are part of the system shown in FIG. 1;

FIG. 4a is a table of values that are determined and stored by an energy monitoring panel that is part of the system shown in FIG. 1;

FIG. 4b is another table of values that are determined and stored by another energy monitoring panel that is part of the system shown in FIG. 1;

DETAILED DESCRIPTION

Figure 1:
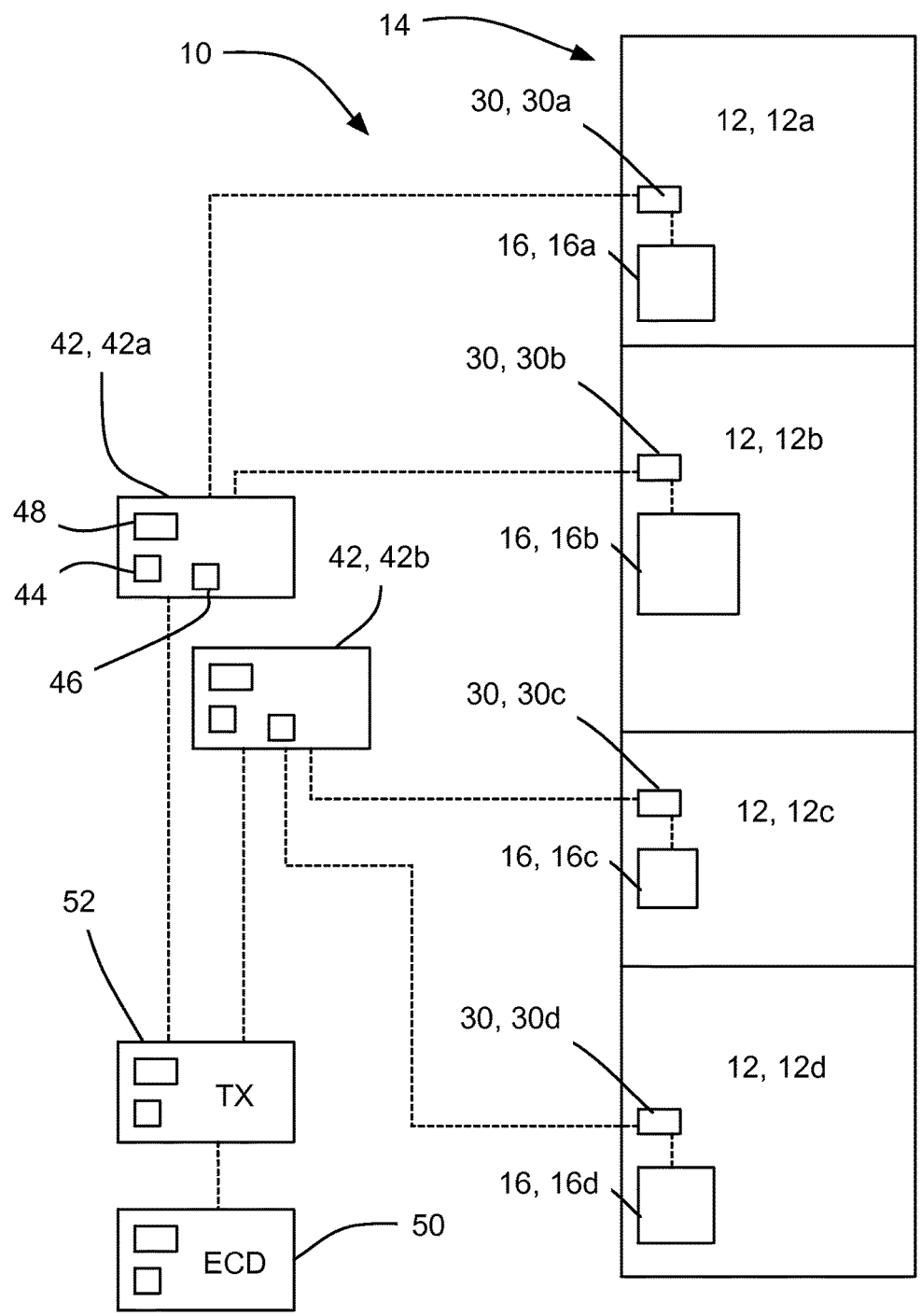
FIG. 1 is a schematic layout of a system for determining an energy usage cost for one or more selected units of a multi-tenanted building according to a non-limiting embodiment.

Reference is made to FIG. 1, which shows a system 10 for determining an energy usage cost for one or more selected units 12 (and shown individually in the example shown in FIG. 1 at 12a, 12b, 12c and 12d) of a multi-tenanted building shown at 14. The units 12 and the multi-tenanted building 14 (and all other elements) of FIG. 1 are shown schematically. The term 'unit' is contemplated to cover any type of individual location that is separated from the other units or locations. For example, each unit may be an apartment, a condo, a strata unit, an office, or a commercial space that holds one or more people. Each unit 12 has an air mover 16 in it, which may be any suitable type of air mover, such as, for example, a four-pipe fan coil unit, a two-pipe fan coil unit, a hybrid heat pump, a water source heat pump or a perimeter heating unit. Each air mover 16 is referred to individually at 16a, 16b, 16c and 16d.

Figure 2:
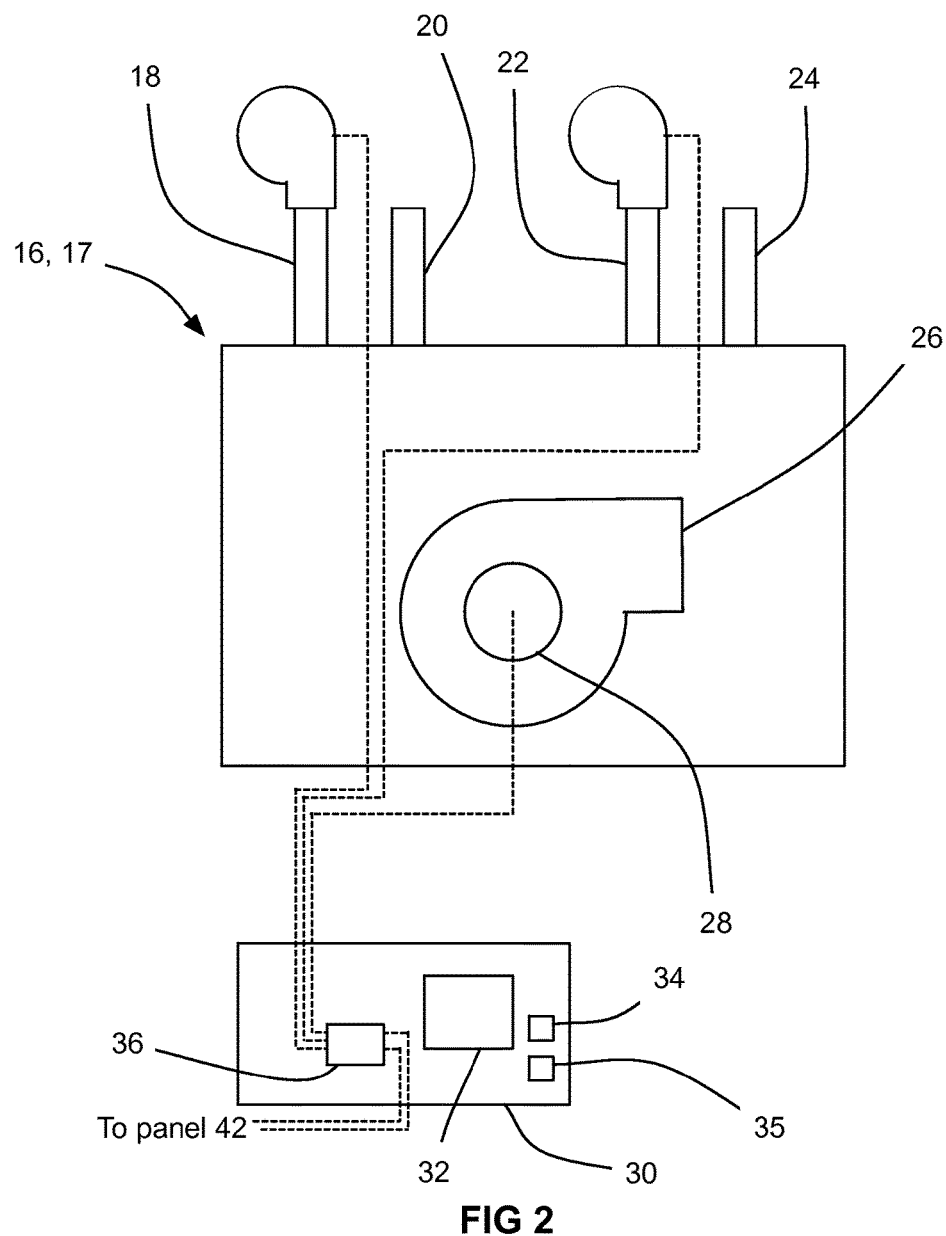
FIG. 2 is a schematic view of an air mover that may be part of the system shown in FIG. 1.

An example of a suitable air mover 16 is shown in FIG. 2, and is a four-pipe fan coil unit 17 and has a heating liquid inlet 18, a heating liquid outlet 20, a cooling liquid inlet 22 and a cooling liquid outlet 24. The air mover 16 also includes a fan 26 with a fan motor 28. The fan motor 28 may be a constant flow rate motor, which is configured to provide a constant volumetric flow rate of air from the fan 26, substantially regardless of the conditions in which the fan coil unit 16 is operating. For example, if the fan motor 28 is set to drive the air mover 16 to deliver 500 CFM, then the motor 28 will control the fan to deliver 500 CFM regardless of whether the air filter on the air mover 16 is a new air filter or whether it is clogged, and regardless of whether the ductwork downstream from the fan coil unit 16 is longer in one unit 12 than it is in another unit 12. In other words, regardless of the upstream and downstream conditions, the fan motor 28 will speed up and slow down as needed in order to keep the air mover 16 operating to deliver 500 CFM. An example of such a motor is an ECM™ constant airflow motor sold by Regal Beloit of Fort Wayne, Ind., USA, or any suitable equivalent. The fan motor 28 may be configured to have a plurality of available pre-selected flow rate settings for driving the fan to deliver airflow to the associated unit 12. For example, the fan motor 28 shown in the example in FIG. 2 has three flow rate settings, including a first setting at 35% of maximum output, a second setting at 65% of maximum output and a third setting at 95% of maximum output. For the air mover 16a, which may, for example, have a maximum output of 1000 CFM these settings may correspond to 350 CFM output, 650 CFM output, and 950 CFM output respectively. The air mover 16b may be larger than the air mover 16a in order to service the unit 12b, which is larger than the unit 12a. For example, the air mover 16b may be sized to provide a maximum output of 1500 CFM. The fan motor 28 for the air mover 16b may have a first setting at 35% of maximum output which would correspond to a 525 CFM output for the fan, a second setting at 65% of maximum output which would correspond to 975 CFM, and a third setting at 95% of maximum which would correspond to 1425 CFM. The third air mover 16c may be smaller than the air mover 16a for servicing the unit 12c and may have a maximum output of, for example, 500 CFM and may have first, second and third flow rate settings of 35%, 65% and 95% of maximum output respectively, which would correspond to outputs of 175 CFM, 325 CFM and 475 CFM respectively. The fourth air mover 16d may be sized the same as the first air mover 16a and may service a unit that is the same size as the first unit 12a.

Referring to FIG. 1, a control panel 30 may be provided in each unit 12 to permit occupants of each unit 12 to control the operation of the associated air mover 16 for that unit 12. The control panels 30 are shown individually at 30a, 30b, 30c and 30d in the units 12a, 12b, 12c and 12d. The control panel 30 may be configured to permit an occupant to select one of the speed settings for the fan 16 and to select whether heating or cooling is desired. This selection by the occupant may be carried out indirectly. For example, the occupant may select a desired temperature for the unit 12 that is lower than a current temperature for the unit 12. As a result, the control panel 30 initiates cooling for the unit 12. Alternatively, if the occupant selects a desired temperature that is higher than a current temperature, then the control panel 30 will initiate heating of the unit 12. The control panel 30 may include any suitable user interface for the purpose of permitting control by the occupant, such as a touch screen 32 (FIG. 2) which acts as both an input device to permit an occupant to enter the above inputs, and an output device to indicate data such as the currently selected desired temperature and the current temperature in the unit 12 (FIG. 1). The control panel 30 may include a microprocessor 34 (FIG. 2) and a memory 35 which permit it to store and execute programs in order to receive user inputs and to control the operation of the air mover 16 for the unit 12 (FIG. 1).

Figure 3B:
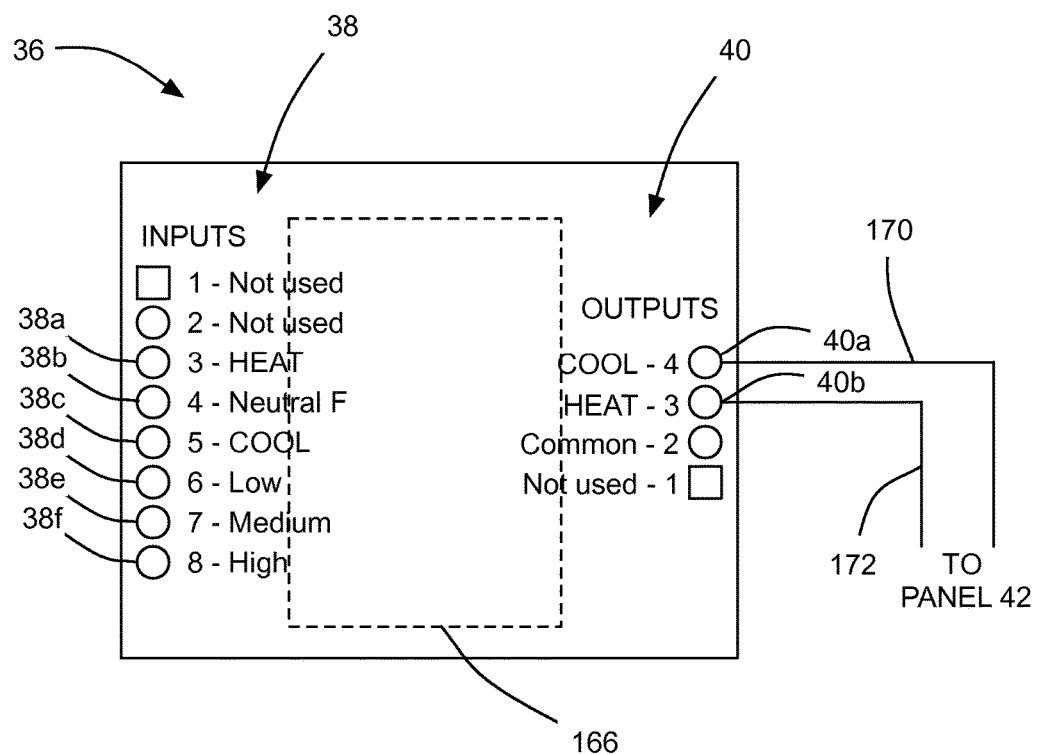

The terminal block 36 is shown in more detail with reference to FIGS. 3a and 3b. The terminal block 36 includes an input region 38 that receives signals from the air mover 16 that are indicative of the requested fan speed and whether heating or cooling has been selected by the unit occupant. In the example embodiment shown, the terminal block 36 includes a first (heating) input 38a that indicates whether heating is currently selected for the unit 12 (FIG. 1), a neutral input 38b, a second (cooling) input 38c that indicates whether cooling is selected for the unit 12 (FIG. 1), and at least one third (flow rate) input, which is indicative of the volumetric flow rate for the air mover 16. In the example shown, there are three flow rate inputs, including a first (low) flow rate input 38d that indicates whether the low flow rate setting is currently selected for the air mover fan motor 28 (FIG. 2), a second (medium) flow rate input 38e that indicates whether the second (medium) flow rate setting is currently selected for the air mover fan motor 28 (FIG. 2), and a third (high) flow rate input 38f that indicates whether the third (high) flow rate setting is currently selected for the air mover fan motor 28 (FIG. 2).

If heating is currently selected, a heating solenoid 150 (FIG. 3a) is moved to a position shown in FIG. 3c, in which the solenoid 150 closes a circuit with electrical conduits 152 and 154 so that a 24 VDC signal is sent to the input 38a, while a cooling solenoid 156 is in a position shown in FIG. 3a so that there is no voltage at input 38c. If cooling is currently selected, the solenoid 156 (FIG. 3a) is moved to a position shown in FIG. 3d, in which the solenoid 156 closes a circuit with electrical conduits 158 and 154 so that a 24 VDC signal is sent to the input 38c, while the solenoid 150 is in a position shown in FIG. 3a so that there is no voltage at input 38a. Additionally, conduits 160, 162 and 164 are connected to inputs 38d, 38e and 38f respectively. Depending on which fan speed setting is selected, a fan speed switch which has three contacts (not shown) causes one of the three conduits 160, 162 or 164, and therefore one of the three contacts or inputs 38d, 38e, or 38f to carry a 24 VDC signal.

A circuit represented by block 166 sends suitable signals to an output region 40 of the terminal block 36 based on the signals received at the input region 38. In the example embodiment shown, the output region 40 includes a cooling output 40a that transmits a signal if the cooling input 38a receives a signal, a heating output 40b that transmits a signal if the cooling input 38c receives a signal, and a neutral output 40c. The cooling output 40a may connect to a first output conduit 170 (e.g. a two-wire, twisted, shielded electrical conduit) that connects between the cooling output 40a and an input on the associated energy monitoring panel 42 (FIG. 1). The heating output 40b may connect to a second output conduit 172 (e.g. a two-wire, twisted, shielded electrical conduit) that connects between the cooling output 40b and another input on the associated energy monitoring panel 42 (FIG. 1). If the heating input 38a receives a signal, then the heating output 40b transmits a signal to the energy monitoring panel 42 that is based on which flow rate input 38d, 38e or 38f receives a signal. For example, if the first flow rate input 38d receives a signal, then the heating output 40b transmits a signal at a first voltage (e.g. 1.5V). If the second flow rate input 38e receives a signal, then the heating output 40b transmits a signal at a second voltage (e.g. 3V). If the third flow rate input 38f receives a signal, then the heating output 40b transmits a signal at a third voltage (e.g. 5V).

The energy monitoring panel 42 is configured to receive the output signals from the terminal block 36 and includes a processor 44 and a memory 46. The processor 44 may convert the signals to energy usage data and may store the data in memory 46. The energy monitoring panel 42 may be configured to receive the output signals from the terminal blocks 36 from a plurality of units 12. Depending on how many units 12 are in the multi-tenanted building 14, a plurality of energy monitoring panels 42 may be provided. In the example shown in FIG. 1, a first energy monitoring panel 42a is provided to receive output signals from the terminal blocks 36 from units 12a and 12b, and a second energy monitoring panel 42b is provided to receive output signals from the terminal blocks 36 from units 12c and 12d.

The panel 42 includes a clock 48 so as to determine the duration that it received a signal that the heating or cooling was on. Additionally, the panel 42 has stored in memory the flow rate values (e.g. in CFM) that correspond to the different flow rate settings for each air mover 16. With this information, the output signals from each terminal block 36 to the associated energy monitoring panel 42 can be converted to energy usage data by the panel 42. For example, the panel 42 may, using its clock 48, determine that it received a signal (e.g. a 3V signal) from output 40b from the terminal block 36 of unit 12a for a total of 64 minutes at which point the signal from output 40b from the terminal block 36 of unit 12a stopped (e.g. went to 0V). The 3V signal indicates that the medium flow rate was selected during that period. The panel 42 determines, using the information stored in memory 46, that a 3V signal for the air mover 16a corresponds to a flow rate of 650 CFM. Thus, the panel 42, for each unit 12 that it monitors, may store in a table in memory 46, an indication of what type of signal was received (e.g. heating or cooling), the duration that it received the heating or cooling signal, and a flow rate value based on the flow rate setting of the fan 16 that was used, while obtaining very simple outputs from the terminal block 36 from each unit 12. Any time that an occupant changes a selection at the local control panel 30, the energy monitoring panel 42 receives that selection change and records the new usage information in a separate data entry. In the example tables shown in FIGS. 4a and 4b, the unit number is stored as a numeric value, such that Unit 1 in the table, would correspond to unit 12a in FIG. 1. Similarly Units 2, 3 and 4 in the table would correspond to units 12b, 12c and 12d respectively, in FIG. 1.

It will be noted that, in the example embodiment shown herein, only two pairs of wires need to be routed between the terminal block 36 and the energy monitoring panel 42, while providing all the information needed for the energy monitoring system 10 (FIG. 1) to accurately determine the energy usage for each unit.

FIG. 4a shows an example table of data that the example energy monitoring panel 42a could record for a hypothetical time period, denoted by TP (a value, which is not shown in the figures). The first entry into the table is based on the conversion described above. In the table:

Unit 12a spent 64 minutes of cooling with the air mover 16a set at 350 CFM;

Unit 12b spent 114 minutes of cooling with the air mover 16b set at 1425 CFM;

Unit 12b also spent 23 minutes of cooling with the air mover 16b set at 525 CFM;

Unit 12a spent 18 minutes of heating with the air mover 16a set at 350 CFM;

and so on. In the table in FIG. 4a, Unit 1 refers to unit 12a and Unit 2 refers to unit 12b. FIG. 4b shows an example table of data that the example energy monitoring panel 42b could record for the same hypothetical time period TP, where Unit 3 in the table refers to unit 12c and Unit 4 refers to unit 12d.

Regularly, the data may be sent to a central energy cost determination system 50 that collects data from all of the energy monitoring panels 42 via a transmitter shown at 52. In the event that a problem occurs with the transmission of the data, the energy monitoring panels 42 may each be capable of storing a selected amount of data, such as, for example, 35 days worth of data, while polling every 3 seconds. Any other suitable polling frequency and storage capacity may alternatively be provided.

The central energy cost determination system 50 collects the data from the panels 42 and determines the energy usage factor and an energy usage cost for the unit based on the data. The energy usage factor may be determined separately for heating and for cooling for each unit. The energy usage factor for cooling for the unit 12a may be determined as the sum of the CFMs×time for each entry relating to cooling of unit 12a in the data, divided by the sum of the CFM's×time for each entry in the table for all the units 12 combined. For example, using the example data from FIGS. 4a and 4b, the system 50 can determine that the cooling energy usage factor for unit 12a is: ((350×64))/((350×64)+(1425×114)+(525× 23)+(1425×14)+(525×24)+(350×64)+(175×80)+(650×56)+ (325×80)+(175×97)), which equals 22400/362225, or 0.062. The cooling energy usage factor for unit 12b using the data in FIGS. 4a and 4b is: ((1425×114)+(525×23)+(1425×14)+ (525×24))/((350×64)+(1425×114)+(525×23)+(1425×14)+ (525×24)+(350×64)+(175×80)+(650×56)+(325×80)+(175× 97)), which equals 207075/362225, or 0.572. The other cooling energy usage factors (for units 12c and 12d) can be determined in an analogous manner. The heating energy usage factor for unit 12a using the data in FIGS. 4a and 4b is: ((350×18)+(350×48))/((350×18)+(350×48)+(525×32)+ (475×24)+(325×112)+(350×24)), which equals 23100/ 96100, or 0.240. The heating energy usage factor for unit 12b using the data in FIGS. 4a and 4b is: ((525×32))/((350× 18)+(350×48)+(525×32)+(475×24)+(325×112)+(350×24)), which equals 16800/96100, or 0.175. The other heating energy usage factors (for units 12c and 12d) can be determined in an analogous manner.

To determine the cooling energy usage cost for each unit for the time period TP, the energy cost determination system 50 may be provided with the total cooling cost associated with the units 12a-12d and it can determine the energy usage cost for each unit 12 for the time period TP, by multiplying the total cost by the cooling energy usage factor associated with each unit. For example, if the total cost for cooling the units 12a-12d was $1000 for the time period TP, the system 50 can determine the cooling energy usage cost for unit 12a to be 0.062×$1000, which is $62.00, and the cooling energy usage cost for unit 12b to be 0.572×$1000, which is $572.00. Similarly, to determine the heating energy usage cost for each unit 12 for the time period TP, the energy cost determination system 50 may be provided with the total heating cost associated with the units 12a-12d and it can determine the energy usage cost for each unit 12 for the time period TP, by multiplying the total cost by the heating energy usage factor associated with each unit. For example, if the total cost for heating the units 12a-12b for the time period TP is $400, the system 50 can determine the heating energy usage cost for unit 12a to be 0.240×$400, which is $96.00, and the heating energy usage cost for unit 12b to be 0.175×$400, which is $70.00. Similar calculations may be performed to determine the cooling and heating energy usage costs for the units 12c and 12d.

It will be noted that the methodology described above is useful particularly in relation to a four pipe fan coil unit which permits each unit 12 to heat or cool as the occupants wish, while others of the units 12 may also heat or cool as their occupants wish, independent of one another. Because the unit cost for heating energy is not the same as the unit cost for cooling energy, the system 50 determines a separate heating energy usage factor and cost for each unit 12, and a separate cooling energy usage factor and cost for each unit 12. By contrast, in embodiments in which the air movers 16 are two pipe fan coil units, the energy cost determination panel 50 has reduced complexity since all the units 12 in the dwelling 14 are consuming the same type of energy, (e.g. energy for heating the units 12).

Figure 5:
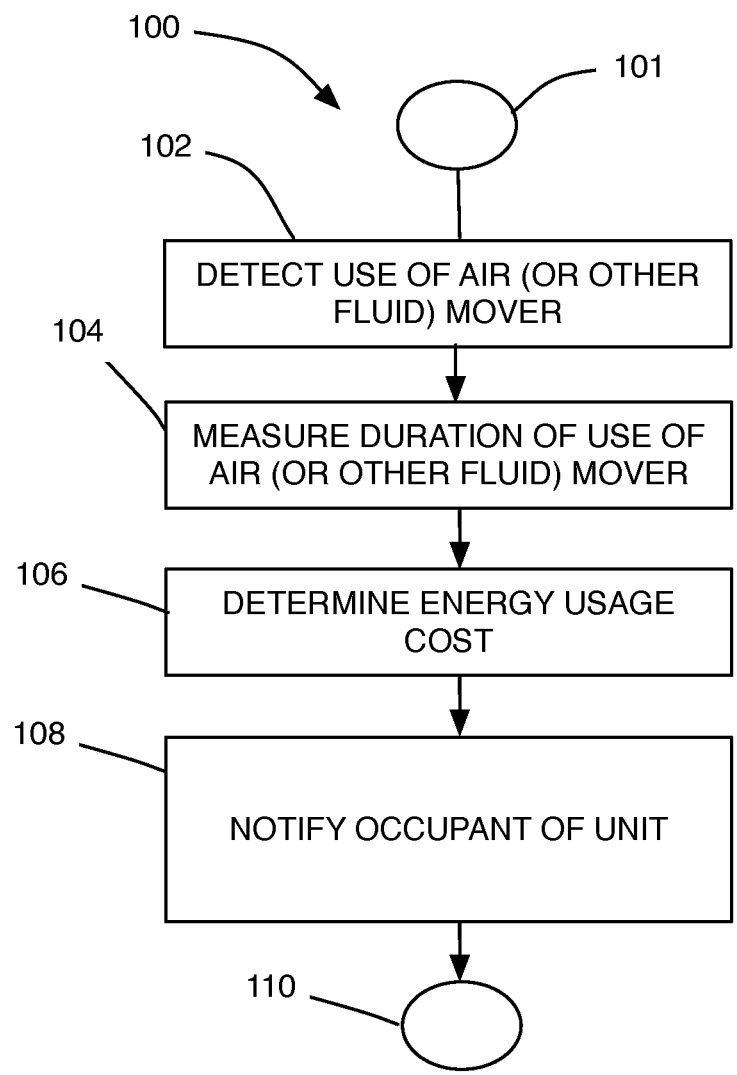
FIG. 5 is a flow diagram of a method of determining an energy usage cost for one or more selected units of a multi-tenanted building according to another non-limiting embodiment.

A method for determining an energy usage cost over a time period (e.g. period TP) for a selected unit (e.g. unit 12a) of a multi-tenanted building such as dwelling 14, is shown at 100 in FIG. 5. The method 100 may be used in embodiments particularly where each unit has an air mover associated therewith that is selectably operable at a plurality of pre-selected volumetric flow rates to deliver airflow to the unit. The air mover utilizes an air mover motor (e.g. such as motor 28) that is controlled to automatically adjust its speed to maintain whichever of the pre-selected volumetric flow rates it was set at. The method starts at 101, and includes a step 102, which is to detect any uses of the air movers for any of the units and detect the pre-selected volumetric flow rate at which the air mover whose use is detected is operating. Step 104 is monitoring, for each use of the air movers, a duration of use of the air mover. Step 106 is determining an energy usage cost for the selected unit over the time period based on the durations of use during any detected uses of the air mover for the selected unit over the time period, based on the pre-selected volumetric flow rate associated with each detected use, and based on the durations of use during any detected uses of the air movers for the other units over the time period, and based on a total energy usage cost for all the units of the multi-tenanted building. Step 108 may optionally be to indicate to an occupant of the unit the energy usage cost for the unit for the time period. Step 108 may include, for example, billing the occupant of the unit based on the energy usage cost for the selected unit. Alternatively, the occupant may be able to access information relating to their energy usage cost on a website developed for that purpose. The method 100 ends at 110.

Figure 6:
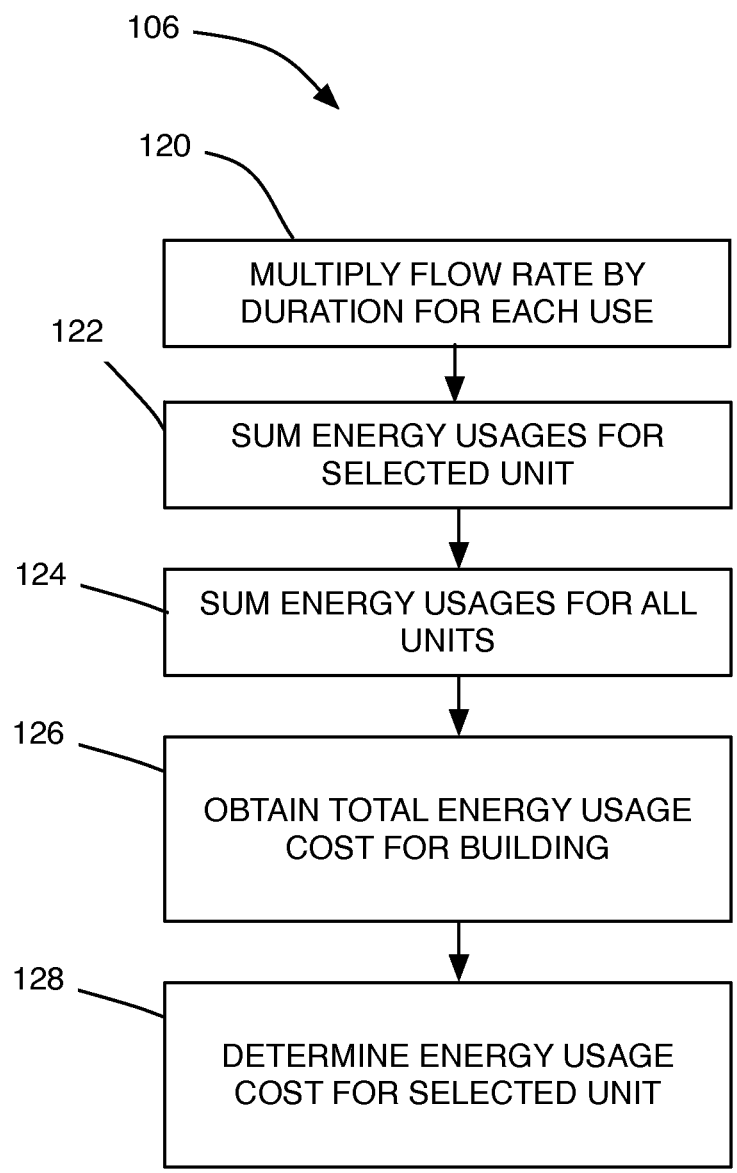
FIG. 6 is a flow diagram of a group of steps that optionally make up one of the steps shown in FIG. 5.

Optionally, step 106 of the method 100 may be carried out as shown in FIG. 6. For example, step 106 may include a stop 120, which is multiplying the pre-selected flow rate by the duration for each use of the air mover for each of the units to arrive at an energy usage for each use of the air mover for each unit in the time period. Step 122 is summing all the energy usages for all the uses of the air mover for the selected unit over the time period, to arrive at a total energy usage value for the selected unit over the time period. Step 124 is summing all the energy usages for all the uses of the air movers for all the units of the multi-tenanted building. Step 126 is obtaining the total energy usage cost for all the units of the multi-tenanted building. Step 128 is determining the energy usage cost for the selected unit based on multiplying the total energy usage cost by the ratio of the value determined in step 122 to the value determined in step 124.

It will be noted that, by incorporating air movers 16 that include consistent volume airflow rates, the signals that can be sent to the panel 42 to determine the usage may be relatively simple signals such as a digital signal (e.g. 0 or 5V) for each of the heating and cooling to indicate whether the heating or cooling had been turned on, and a second signal that may have any one of a plurality of pre-selected voltages to indicate the flow rate setting for the air mover.

The control panels 30 in the units 12, the energy monitoring panels 42, the transmitter 52 and the energy cost determination panel 50 may all together be considered a monitoring system.

It has been determined that the above described system and method are accurate and does not require the measurement of the temperature of water that may be used for the purpose of cooling or heating air used by the air movers 16 to cool or heat the associated units 12, or the measurement of the temperature of air moving through the air movers 16.

It is possible to provide the system described above as a retrofit to existing multi-tenanted buildings. For example, in a situation where a multi-tenanted building exists with a multi-speed fan for each unit, one could supply panels 42, could optionally replace the motors on the fans with motors that can maintain a selected flow rate, and if needed could supply terminal blocks 36 and control panels 30. The programming of the panels 42 and 30 and the user interface on the panels 30 may be similar to that which is shown in the figures.

In an embodiment, the system 10 could be configured so that the flow rate settings are selectable by the occupants of the unit.

While the disclosure above provides examples of air movers, it is alternatively possible to provide any suitable type of fluid mover instead of an air mover specifically. For example, the fluid mover may be a liquid mover (which may include a pump, for example) could alternatively be provided for moving liquid through each unit 12.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A method for determining an energy usage cost over a time period for a selected unit of a multi-unit building having a plurality of units including the selected unit and a plurality of other units, wherein each unit has an air mover associated therewith that is selectably operable at a plurality of pre-selected volumetric flow rates via a control system to deliver airflow to the associated unit, the method comprising:
   a) receiving, via a monitoring system coupled to at least two of the control systems, signals from a subset of the at least two of the control systems that are conditioned to operate corresponding ones of the air movers, the signals identifying one of the plurality of the pre-selected volumetric flow rates at which the subset of the at least two of the control systems is operating the corresponding ones of the air movers;
   b) registering durations of use during which one of the at least two of the control systems is conditioned to operate a corresponding one of the air movers, and, for each of the durations of use, a corresponding one of the plurality of pre-selected volumetric flow rates at which the one of the at least two of the control systems was conditioned to operate the corresponding one of the air movers;
   c) determining an energy usage cost for the selected unit over the time period as a portion of a total energy usage cost for all of the units of the multi-unit building, the portion being based on the durations of use and the corresponding ones of the plurality of pre-selected volumetric flow rates of the air mover of the selected unit over the time period, the durations of use and the corresponding ones of the plurality of pre-selected volumetric flow rates of all of the air movers during the time period; and
   d) outputting the energy usage cost for the selected unit for the time period.

2. A method as claimed in claim 1, wherein step c) includes:
   e) totalling, for each of the air movers, the product, for each duration of use during the time period, of the pre-selected volumetric flow rate and the duration of use to arrive at an energy usage for each of the units in the time period;
   f) determining a total energy usage by totalling all of the energy usages for all of the units of the multi-unit building during the time period; and
   g) determining the energy usage cost for the selected unit based on multiplying the total energy usage cost for all of the units in the multi-unit building by a ratio of the energy usage determined for the selected unit in step e) to the total energy usage determined in step f).

3. A method as claimed in claim 1, wherein step d) includes billing the occupants of the selected unit based on the energy usage cost for the selected unit.

4. A method as claimed in claim 1, wherein each of the air movers for each of the units is controlled by an air mover motor that is configured to adjust speed to maintain any of the pre-selected volumetric flow rates.

5. A method as claimed in claim 1, wherein each of the air movers is a four pipe fan coil unit.

6. A method as claimed in claim 5, wherein the energy usage cost for the selected unit is a cooling energy usage cost for the selected unit and is based solely on any uses of the air mover for the selected unit in which the air mover for the selected unit was used to cool the selected unit, and wherein a heating energy usage cost for the selected unit is determined based solely on any uses of the air mover for the selected unit in which the air mover was used to heat the selected unit.

7. A system for determining an energy usage cost over a time period for a selected unit of a multi-unit building having a plurality of units including the selected unit and a plurality of other units, the system comprising:
   a control system coupled to an air mover for each of the plurality of units configured to operate the air mover at a plurality of pre-selected volumetric flow rates to deliver airflow to the unit; and
   a monitoring system coupled to the control systems and configured to:
   a) receive signals from a subset of the at least two of the control systems that are conditioned to operate corresponding ones of the air movers, the signals identifying one of the plurality of the pre-selected volumetric flow rates at which the subset of the at least two of the control systems is operating the corresponding ones of the air movers;
   b) register durations of use during which one of the at least two of the control systems is conditioned to operate a corresponding one of the air movers, and, for each of the durations of use, a corresponding one of the plurality of pre-selected volumetric flow rates at which the one of the at least two of the control systems was conditioned to operate the corresponding one of the air movers;

c) determine an energy usage cost for the selected unit over the time period as a portion of a total energy usage cost for all of the units of the multi-unit building, the portion being based on the durations of use and the corresponding ones of the plurality of pre-selected volumetric flow rates of the air mover of the selected unit over the time period, the durations of use and the corresponding ones of the plurality of pre-selected volumetric flow rates of all of the air movers during the time period; and d) outputting the energy usage cost for the selected unit for the time period.

8. A system as claimed in claim 7, wherein, to carry out step c), the monitoring system is configured to:

e) totalling, for each of the air movers, the product, for each duration of use during the time period, of the pre-selected volumetric flow rate and the duration of use for each of the units in the time period;

f) determine a total energy usage by totalling all of the total energy usages for all of the units of the multi-unit building; and g) determine the energy usage cost for the selected unit based on multiplying the total energy usage cost for all of the units in the multi-unit building by a ratio of the energy usage determined for the selected unit in step e) to the total energy usage determined in step f).

9. A system as claimed in claim 7, wherein step d) includes billing the occupants of the selected unit based on the energy usage cost for the selected unit.

10. A system as claimed in claim 7, wherein each of the air movers for each of the units is controlled by an air mover motor that is configured to automatically adjust the speed of the air mover motor to maintain the air mover at a selected one of the plurality of pre-selected air flow rates.

11. A system as claimed in claim 7, wherein each of the air movers is one of a two pipe fan coil unit, a four pipe fan coil unit, and a hybrid heat pump unit.

12. A system as claimed in claim 7, wherein the energy usage cost for the selected unit is a cooling energy usage cost for the selected unit and is based solely on any uses of the air mover for the selected unit in which the air mover for the selected unit was used to cool the selected unit, and wherein a heating energy usage cost for the selected unit is determined based solely on any uses of the air mover for the selected unit in which the air mover was used to heat the selected unit.

13. A system as claimed in claim 7, wherein the monitoring system includes an energy monitoring panel that is remote from the air movers, wherein the energy monitoring panel is configured to receive a first output signal via a first electrical conduit, wherein the first output signal is selected from a plurality of pre-selected voltages, wherein each voltage for the first output signal is indicative of one of the pre-selected volumetric flow rates for the air mover when heating the associated unit, and a second output signal via a second electrical conduit, wherein the second output signal is selected from the plurality of pre-selected voltages, wherein each voltage for the second output signal is indicative of one of the pre-selected volumetric flow rates for the air mover when cooling the associated unit.

14. A system as claimed in claim 13, wherein there are one of two and three pre-selected volumetric flow rates for each air mover.

15. A system as claimed in claim 7, wherein the monitoring system includes a terminal block for each unit, wherein the terminal block has a first input configured for receiving a first input signal from the air mover that indicates that heating is selected for the associated unit, a second input configured for receiving a second input signal from the air mover that indicates that cooling is selected for the associated unit, and at least one third input configured for receiving a signal from the air mover that indicates the volumetric flow rate selected for the air mover.

16. A system as claimed in claim 15, wherein the signal that the third input is configured for receiving is transmitted at one of a set of pre-selected voltages.

17. A system for determining an energy usage cost over a time period for a selected unit of a multi-unit building having a plurality of units including the selected unit and a plurality of other units, the system comprising:

a control system coupled to a fluid mover for each of the plurality of units configured to operate the fluid mover at at least one pre-selected volumetric flow rate to deliver fluid flow to the unit; and a monitoring system coupled to the control systems configured to:

a) receive signals from a subset of the at least two of the control systems that are conditioned to operate corresponding ones of the fluid movers, the signals identifying one of the plurality of the pre-selected volumetric flow rates at which the subset of the at least two of the control systems is operating the corresponding ones of the fluid movers;

b) register durations of use during which one of the at least two of the control systems is conditioned to operate a corresponding one of the fluid movers, and, for each of the durations of use, a corresponding one of the plurality of pre-selected volumetric flow rates at which the one of the at least two of the control systems was conditioned to operate the corresponding one of the fluid movers;

c) determine an energy usage cost for the selected unit over the time period as a portion of a total energy usage cost for all of the units of the multi-unit building, the portion being based on the durations of use and the corresponding ones of the plurality of pre-selected volumetric flow rates of the fluid mover of the selected unit over the time period, the durations of use and the corresponding ones of the plurality of pre-selected volumetric flow rates of all of the fluid movers during the time period; and d) output the energy usage cost for the selected unit for the time period.

* * * * *